United States Patent [19]
Zorn

[11] Patent Number: 5,308,123
[45] Date of Patent: May 3, 1994

[54] CORRUGATED HOSE COUPLING
[75] Inventor: Donald Zorn, Kitchener, Canada
[73] Assignee: NCR Corporation, Dayton, Ohio
[21] Appl. No.: 993,583
[22] Filed: Dec. 21, 1992
[51] Int. Cl.⁵ .............................................. F16L 21/02
[52] U.S. Cl. ................................... 285/226; 285/351; 285/370; 285/903; 285/304
[58] Field of Search ............... 285/226, 347, 370, 903, 285/344, 345, 351, 304

[56] References Cited

U.S. PATENT DOCUMENTS

| | | | |
|---|---|---|---|
| 2,551,393 | 5/1951 | Pinger | 285/344 |
| 3,394,954 | 7/1968 | Sarns | 285/347 X |
| 3,565,464 | 2/1971 | Wolf | 265/903 X |
| 3,667,785 | 6/1972 | Kapeker | 285/345 X |
| 3,796,447 | 3/1974 | de Putter | |
| 4,006,922 | 2/1977 | Bartholemew | |
| 4,141,576 | 2/1979 | Lupke et al. | |
| 4,437,691 | 3/1984 | Laney | |
| 4,560,189 | 12/1985 | Lang et al. | 285/347 X |
| 4,702,502 | 10/1987 | Shade et al. | |
| 4,946,206 | 8/1990 | Roe et al. | |
| 4,995,832 | 2/1991 | Thommen et al. | |
| 5,053,097 | 10/1991 | Johansson et al. | |

FOREIGN PATENT DOCUMENTS

| | | | |
|---|---|---|---|
| 3047867 | 7/1982 | Fed. Rep. of Germany | 285/903 |
| 49201 | 1/1992 | Japan | 285/903 |

Primary Examiner—Dave W. Arola
Attorney, Agent, or Firm—Elmer Wargo

[57] ABSTRACT

A coupling for coupling a corrugated hose to a socket having a cylindrical body with a "U"-shaped annular recess therein. The hose has an outside surface with parallel grooves therein. The parallel grooves have slanted or tapered sides. Flexible "O"-rings are stretched over the outside surface and placed in the parallel grooves near one end of the hose. The hose with the "O"-rings thereon is pushed into the socket so that the "O"-rings contact the "U"-shaped recess. Each "O" ring provides a seal between each of the tapered sides of the groove in which it is positioned and the "U"-shaped annular recess to provide a three point contact air seal between the hose and the socket.

2 Claims, 3 Drawing Sheets

CORRUGATED HOSE COUPLING

BACKGROUND OF THE INVENTION

1. Field of Invention

This invention relates to a method and coupling for providing an air seal between a corrugated hose and a socket.

2. Background Information

One of the prior art ways of providing an air seal between a corrugated hose and a coupling entailed moulding a boot over the end of the hose. The boot was generally made of urethane in the shape of a tubular cylindrical member which had one end thereof moulded over the end of the hose by a low temperature curing process. The remaining end of the tubular member was then pushed on to a tubular connector in much the same manner that a radiator hose is coupled to the inlet pipe on a car radiator. Generally, such a boot costs about $4.00.

SUMMARY OF THE INVENTION

An object of this invention is to provide a low cost seal between a corrugated hose and a socket.

Another object of this invention is to provide a method for providing a seal between a socket and a corrugated hose.

In one aspect of the invention, there is provided a coupling comprising:

a socket having a cylindrical body having an annular recess therein;

a corrugated hose having an outside surface with grooves therein; and an "O"-ring positioned in one of said grooves near one end of said corrugated hose;

said "O"-ring being positioned in said annular recess when said one end of said corrugated hose is inserted in said socket.

In another aspect of the invention, there is provided a method of providing an air seal between a socket having a cylindrical body having an annular recess therein and a corrugated hose having an outside surface with grooves therein, said method comprising the steps of:

(a) placing a flexible "O"-ring in one of said grooves near one end of said corrugated hose; and (b) moving said one end of said corrugated hose into said socket until said flexible "O"-ring is positioned in said annular recess.

The above advantages, and others, will be more readily understood in connection with the following specification, claims, and drawing.

DETAILED DESCRIPTION OF THE PREFERRED EMBODIMENT

Figure 1:
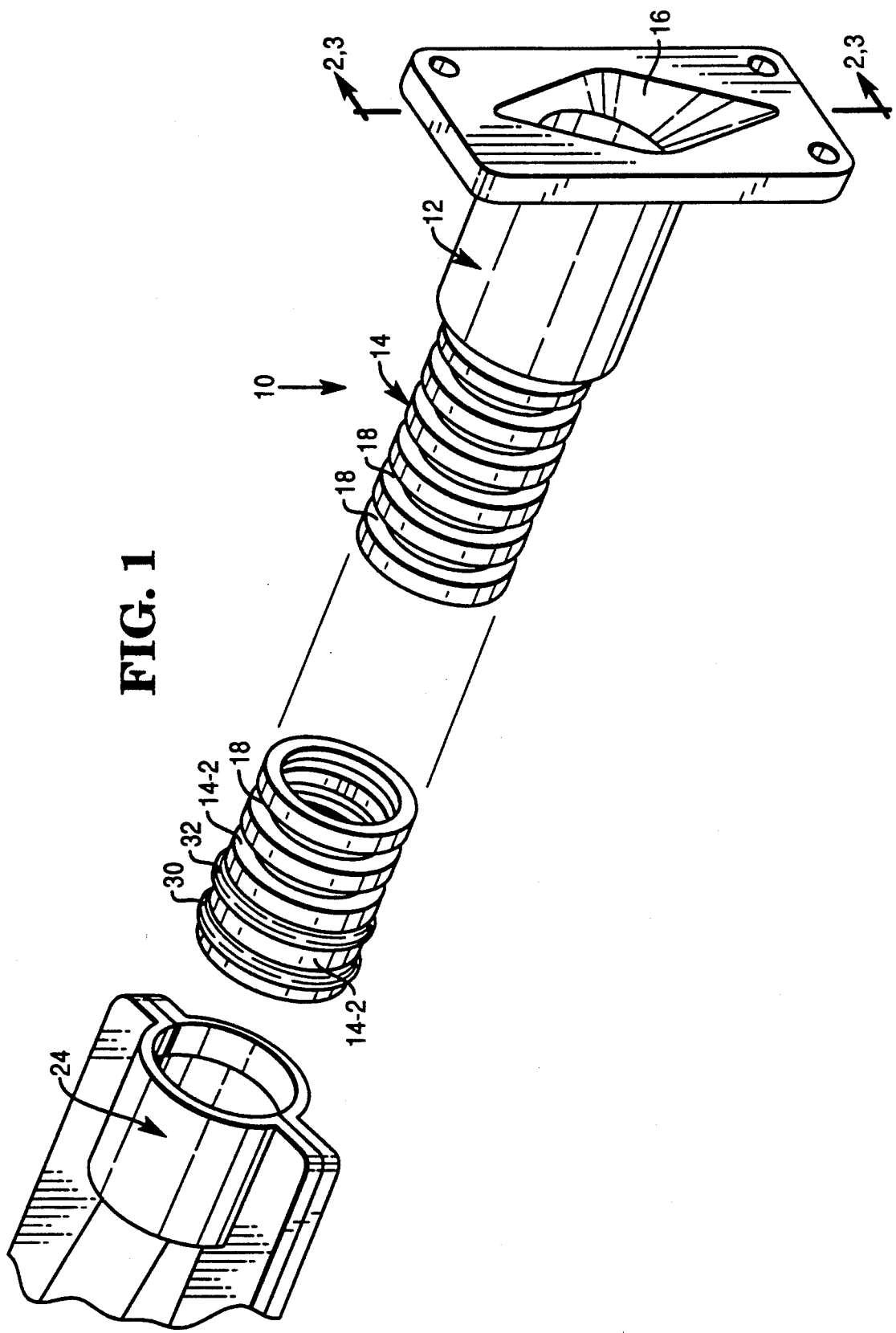
FIG. 1 is an isometric view of a corrugated hose which is coupled to first and second sockets in accordance with this invention.

FIG. 1 is an isometric view, showing a preferred embodiment of a coupling 10 made according to this invention. The coupling 10 includes a socket 12 and a flexible corrugated hose, hereinafter referred to as hose 14. In the embodiment described; the socket 12 is part of an intake manifold 16 which may be part of a vacuuming system which is not important to an understanding of this invention.

The hose 14 has an outside surface with grooves 18 therein, with these grooves 18 being parallel to one another in the embodiment described. The grooves 18 have slanted or tapered sides 20 and 22, as shown in FIG. 3, for example. As seen from FIG. 2, one end 14-1 of the hose 14 is coupled to the socket 12, and the remaining end 14-2 thereof is coupled to a socket 24.

Figure 2:
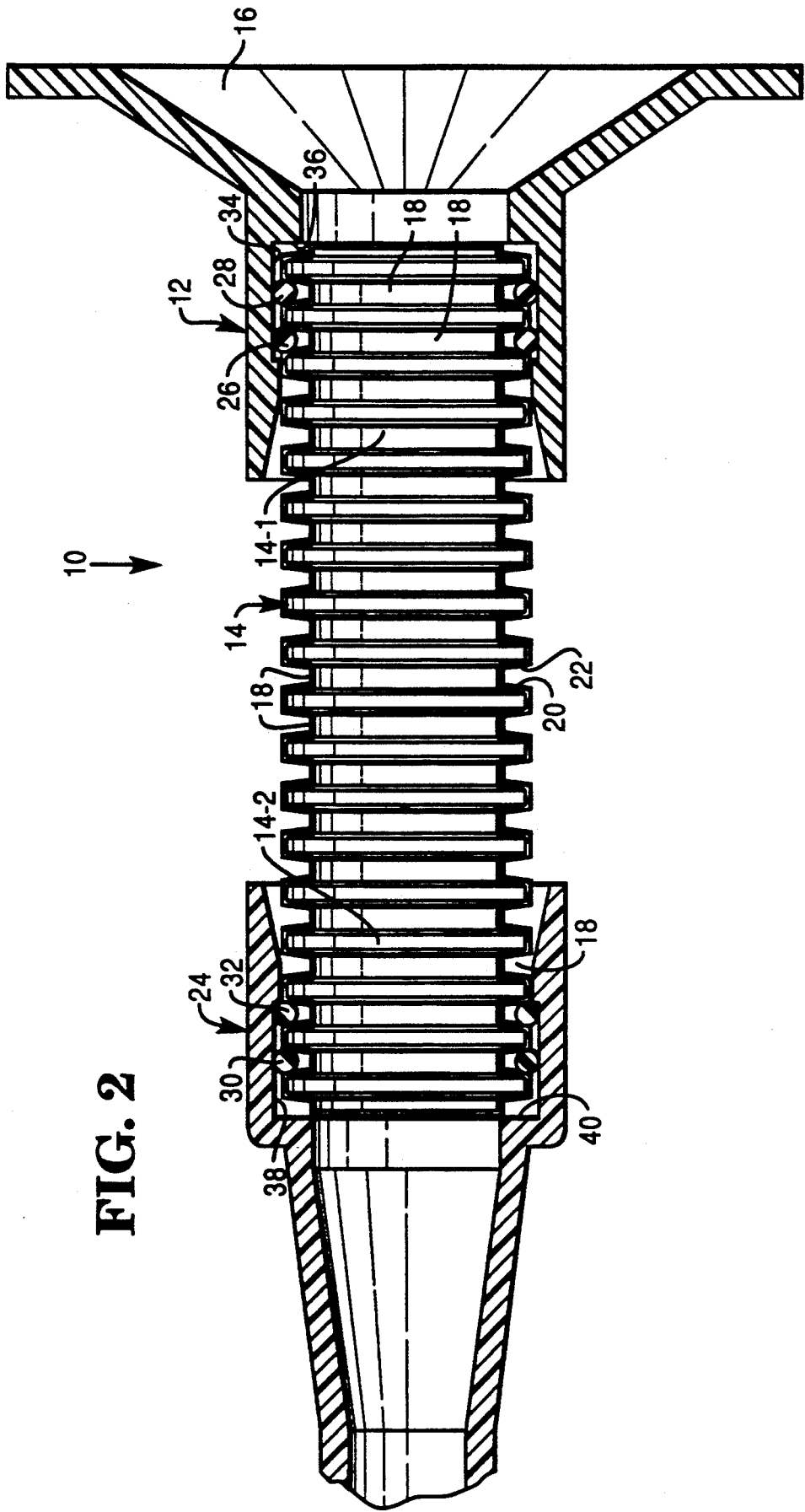
FIG. 2 is a cross sectional view, taken along the line 2—2 of FIG. 1.
Figure 3:
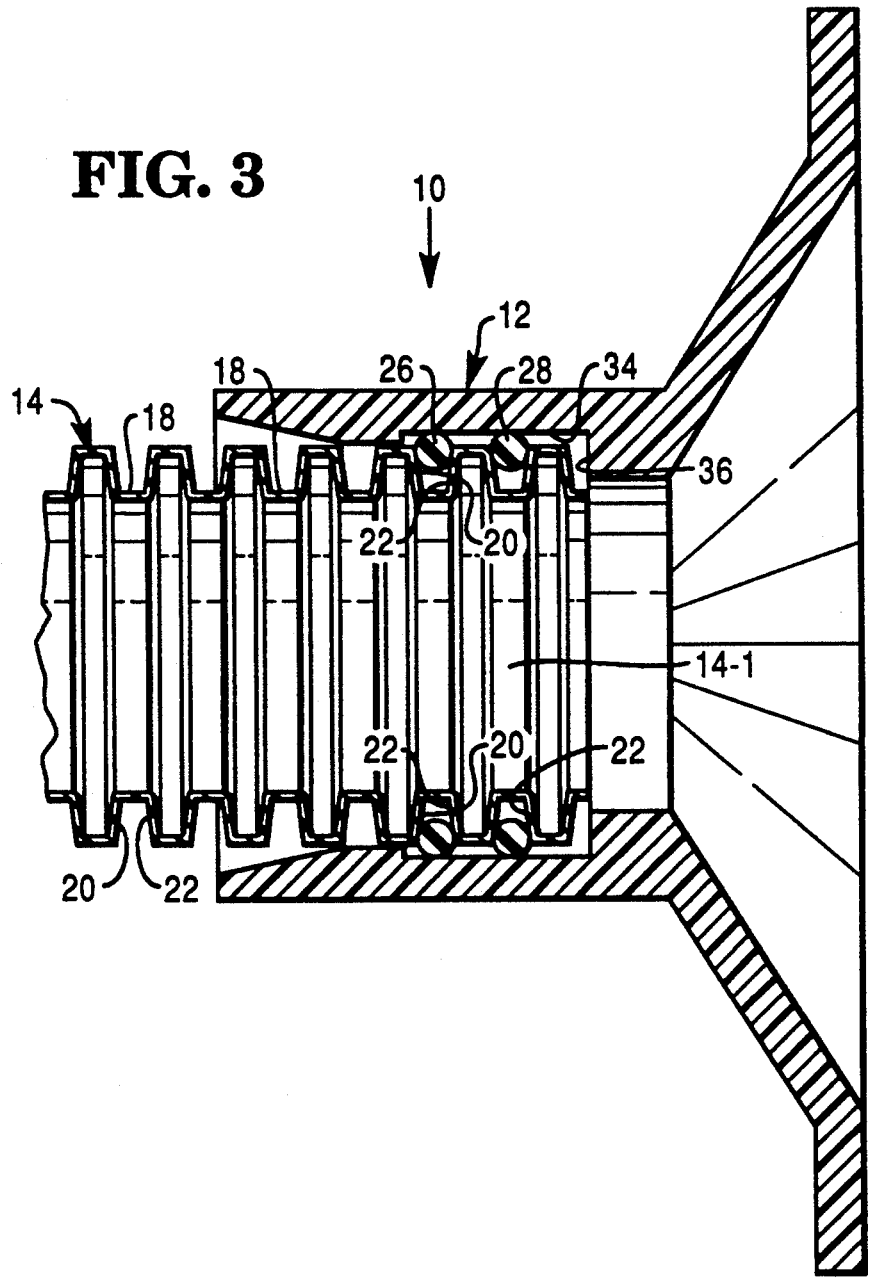
FIG. 3 is a view similar to FIG. 2, showing one of the couplings in enlarged detail.

Part of the coupling 10 also includes "O"-rings 26 and 28 shown in FIGS. 2 and 3. The "O"-rings 26 and 28 are made of resilient material and are stretched and placed in the grooves 18 in a manner similar to that showing "O"-rings 30 and 32 being located in grooves 18 in the remaining end 14-2 of the hose 14, as shown in FIG. 1. The socket 12 has a "U"-shaped recess 34 therein as shown in FIGS. 2 and 3. The one end 14-1 of the hose, with the "O"-rings 26 and 28 thereon, is pushed into the socket 12 until the end 14-1 abuts against an annular shoulder 36 located in the socket 12. Each "O"-ring provides a three point contact or seal between the associated tapered sides 20 and 22 of the associated groove 18 and the "U"-shaped recess 34. The "U"-shaped recess 34 also functions as a detent to keep the hose 14 from being accidentally pulled out of the socket 12.

The socket 24 has an internal shape which is similar to that explained with regard to socket 12. The socket 24 has a "U"-shaped recess 38 to receive the "O" rings 30 and 32, and the socket 24 also has an annular shoulder 40 against which the end 14-2 of the hose abuts when the hose is inserted in the socket 24 as shown in FIG. 2. The cost of the coupling 10 is just a few pennies for the "O"-rings compared to the $4.00 for the boot mentioned in the Background Information.

What is claimed is:

1. A coupling comprised solely of a socket, a flexible corrugated hose, and an "O"-ring:

said socket having a cylindrical body having an annular recess therein;

said flexible corrugated hose having an outside surface with parallel grooves having tapered sides therein;

said "O"-ring positioned in one of said grooves near one end of said flexible corrugated hose;

said "O"-ring being positioned in said annular recess when said one end of said flexible corrugated hose is inserted in said socket to enable said "O"-ring to provide only a three point seal between the tapered sides of the groove in which the "O"-ring is located and the annular recess in said socket; and said socket having an annular shoulder therein to limit the movement of said one end of said flexible corrugated hose into said socket and said "O"-ring cooperating with said annular recess to restrain the movement of said flexible corrugated hose out of said socket.

2. A coupling comprised solely of a socket, a flexible corrugated hose, and first and second flexible "O"-rings;

said socket having a cylindrical body having a "U"-shaped annular recess therein;

said flexible corrugated hose having an outside surface with parallel grooves having tapered sides therein;

said first and second flexible "O"-rings being positioned in first and second ones of said parallel grooves near one end of said flexible corrugated hose;

said first and second flexible "O"-rings being positioned in said "U"-shaped annular recess when said one end of said flexible corrugated hose is inserted in said socket to provide an air seal between said flexible corrugated hose and said socket;

each of said first and second flexible "O"-rings providing only a three point seal between the associated tapered sides of the first and second ones of said parallel grooves, respectively, and the "U"-shaped recess; and said socket having an annular shoulder therein to limit the movement of said one end of said flexible corrugated hose into said socket and said "O"-rings cooperating with said annular recess to restrain the movement of said flexible corrugated hose out of said socket.

* * * * *